(12) United States Patent
Boehm et al.

(10) Patent No.: US 7,273,248 B2
(45) Date of Patent: Sep. 25, 2007

(54) SLIDING ROOF SYSTEM FOR A MOTOR VEHICLE

(75) Inventors: Horst Boehm, Frankfurt am Main (DE); Rainer Grimm, Frankfurt am Main (DE); Christian Biewer, Altheim (DE); Joachim Roeder, Muehlheim (DE)

(73) Assignee: ArvinMeritor GmbH, Dietzenbach (DE)

( * ) Notice: Subject to any disclaimer, the term of this patent is extended or adjusted under 35 U.S.C. 154(b) by 52 days.

(21) Appl. No.: 11/179,759

(22) Filed: Jul. 12, 2005

(65) Prior Publication Data

US 2006/0012224 A1 Jan. 19, 2006

(30) Foreign Application Priority Data

Jul. 16, 2004 (DE) .................. 10 2004 034 463

(51) Int. Cl.
*B60J 7/047* (2006.01)
(52) U.S. Cl. .................... 296/223; 296/216.03
(58) Field of Classification Search ........... 296/216.03, 296/223
See application file for complete search history.

(56) References Cited

U.S. PATENT DOCUMENTS

| | | | |
|---|---|---|---|
| 4,923,245 A * | 5/1990 | Kuwabara ................ 296/214 |
| 4,995,665 A * | 2/1991 | Ichinose et al. ............. 296/213 |
| 5,257,849 A * | 11/1993 | Cheron et al. .............. 296/223 |
| 5,447,355 A | 9/1995 | Kelm | |
| 5,765,908 A * | 6/1998 | Kelm ......................... 296/223 |
| 6,527,337 B2 * | 3/2003 | Farber ........................ 296/222 |
| 7,044,539 B2 * | 5/2006 | Ettl et al. ................. 296/216.03 |
| 2003/0075956 A1 | 4/2003 | Tamura et al. | |

FOREIGN PATENT DOCUMENTS

| | | |
|---|---|---|
| DE | 37 15 268 A1 | 1/1988 |
| DE | 20 2004 001916 U1 | 4/2004 |
| EP | 1 359 037 | 11/2003 |

OTHER PUBLICATIONS

European Search Report, Nov. 2, 2005.

* cited by examiner

*Primary Examiner*—Dennis H. Pedder
(74) *Attorney, Agent, or Firm*—Carlson, Gaskey & Olds

(57) ABSTRACT

A sliding roof system for a motor vehicle includes at least one guide rail, at least one guide carriage movably received in the guide rail, and a cover support that can be shifted relative to the guide rail. The cover support is connected with the guide carriage through two slotted guides and is connected with the guide rail through one slotted guide.

16 Claims, 4 Drawing Sheets

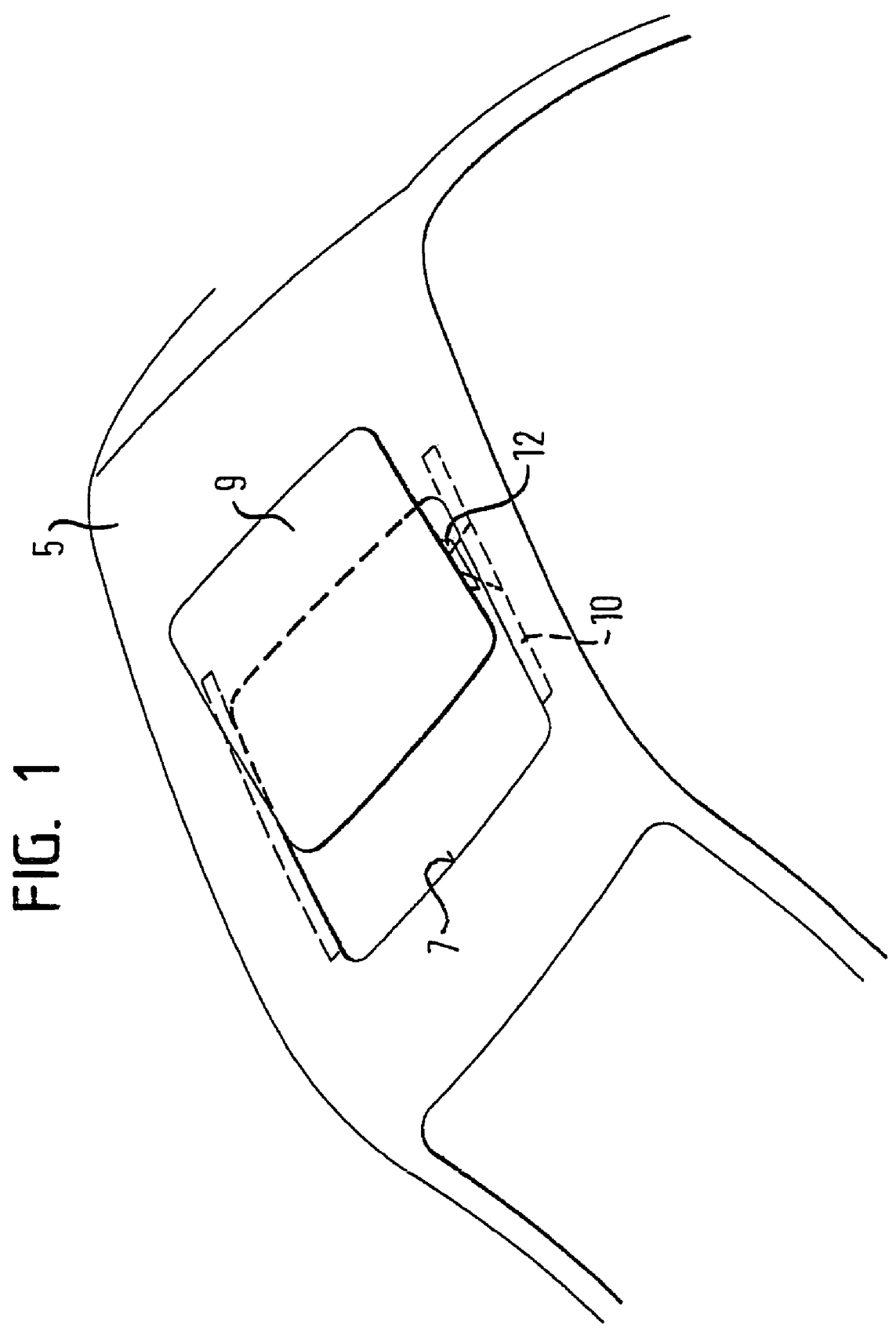

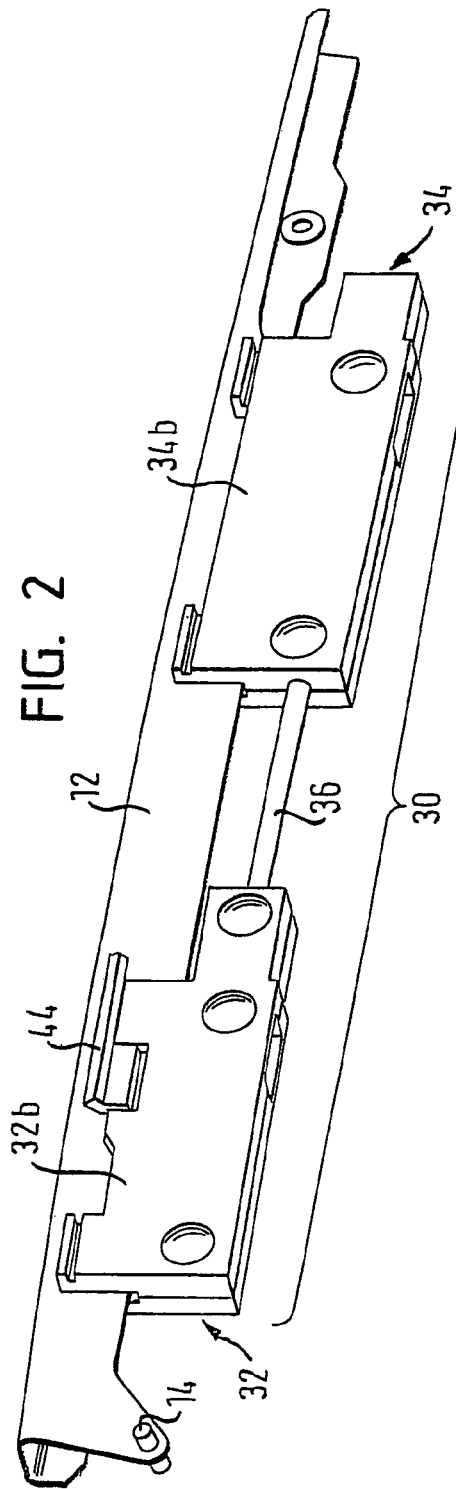
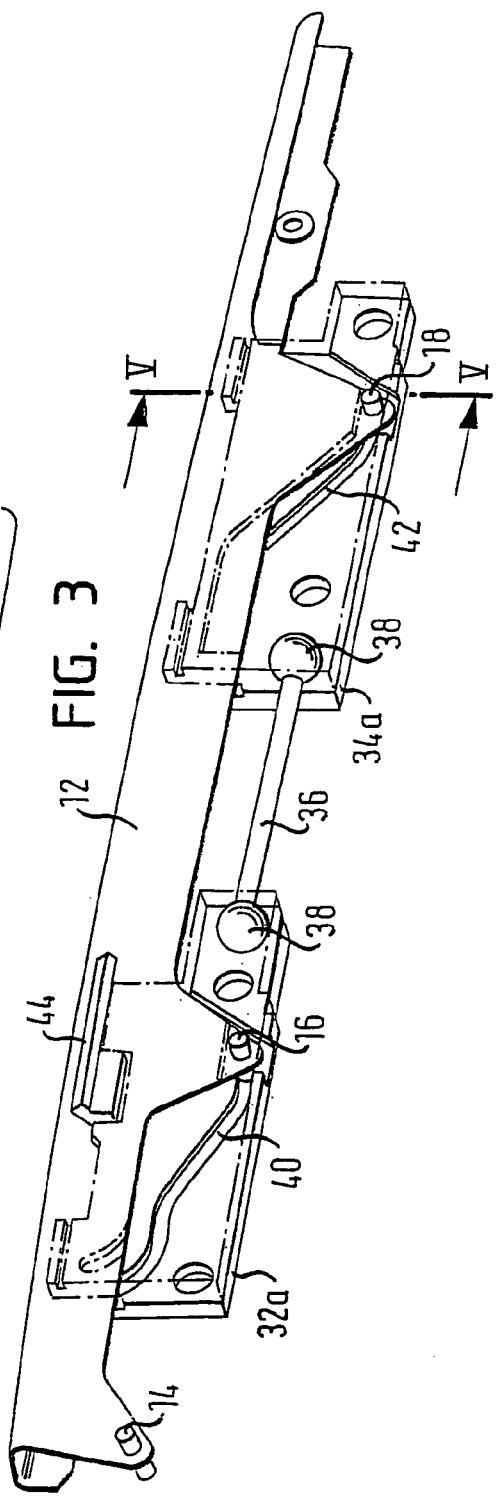

– 1 –

SLIDING ROOF SYSTEM FOR A MOTOR VEHICLE

BACKGROUND OF THE INVENTION

The application claims priority to German Application No. 10 2004 034 463.9 which was filed on Jul. 16, 2004.

The invention relates to a sliding roof system for a motor vehicle, comprising at least one guide rail, at least one guide carriage movably received in the guide rail, and a cover support that can be shifted relative to the guide rail.

Sliding roof systems are generally known. They serve to shift a cover (comprising sheet metal, plastics or glass, for instance) mounted on a cover support between a closed position and an open position. In the closed position, an opening in a vehicle roof will be closed. In the open position, this opening will be at least partially exposed.

All known sliding roof systems have a problem that the cover has to be guided with high precision. On the one hand, inevitable manufacturing tolerances must not result in the entire sliding roof system becoming very sluggish or even getting stuck. On the other hand, the manufacturing tolerances and inevitable system wear over a long service life must not result in various components developing too much play such that the sliding roof system begins to rattle. This leads to quite complex and costly components.

It is the object of the invention to further develop a sliding roof system with simply configured components, and which includes a cover that can be guided with high precision over a long service life.

SUMMARY OF THE INVENTION

According to the invention, a sliding roof system is provided with a cover support that is connected with a guide carriage through two slotted guides, and which is connected with a guide rail through one slotted guide. This provides a mechanically over-determined three-point bearing, which due to the deliberate over-determining provides a particularly precise positioning of the cover support and, hence, of the cover too. The guide carriage may be entirely made from plastic, so that the guide carriage can be manufactured in an easy way.

In a preferred embodiment of the invention, the guide carriage has two parts, which are substantially mirror-inverted, and which receive the cover support between them. In this way, guide slots connecting the cover support with the guide carriage are received almost completely inside the guide carriage, resulting in a particularly high load capacity in a vertical direction, such as against stresses that try to force the cover outwardly away from an interior space of the vehicle.

Also, according to the preferred embodiment of the invention, the guide rail has a guide web that engages into a guide groove provided in the guide carriage. This reduces demands on tolerances that have to be met by various components involved in guiding the guide carriage.

These and other features of the present invention can be best understood from the following specification and drawings, the following of which is a brief description.

BRIEF DESCRIPTION OF THE DRAWINGS

FIG. 1 is a perspective view of a vehicle including a sliding roof system.

FIG. 2 is a perspective view of a guide carriage and a cover support, received therein, of a sliding roof system according to the invention.

FIG. 3 shows an assembly unit of FIG. 2, with one-half of the guide carriage having been removed.

DETAILED DESCRIPTION OF THE PREFERRED EMBODIMENT

Figure 4:
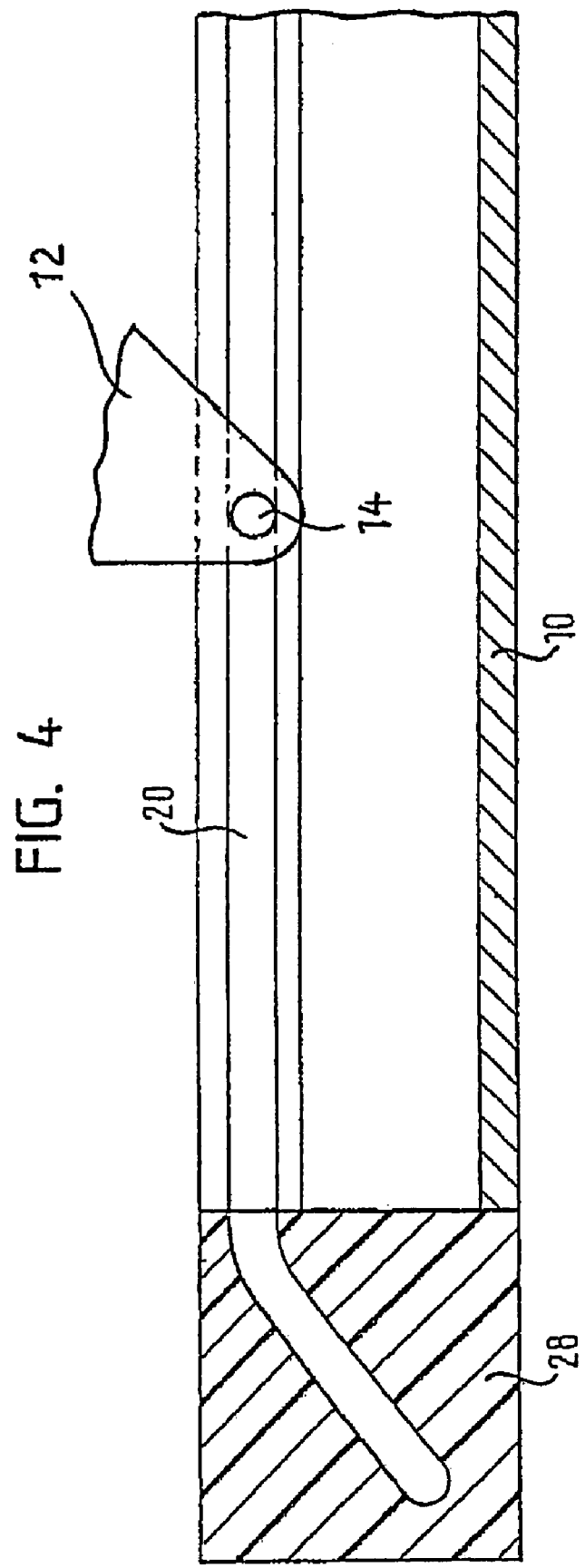
FIG. 4 is a broken sectional view of a guide rail for the sliding roof system according to the invention.

FIG. 1 schematically shows a vehicle roof 5 provided with an opening 7 that can be closed with a movable cover 9 of a sliding roof system. Extending along longitudinal edges of opening 7 are two guide rails 10 that each serve to guide a cover support 12 (see also FIGS. 2 and 3). The cover 9 is supported by the guide rails 10.

Each cover support 12 is a bent component made of metal and is provided with three guide pins 14, 16, 18 that each are inserted in one retaining portion and protrude on a side facing away from the cover 9. Related to the direction of travel of the vehicle, the guide pin 14 is at a front end of the vehicle, while the guide pin 18 is at a rear end of the vehicle. Guide pin 16 is positioned between the guide pin 14 at the front end and the guide pin 18 at the rear end.

Figure 5:
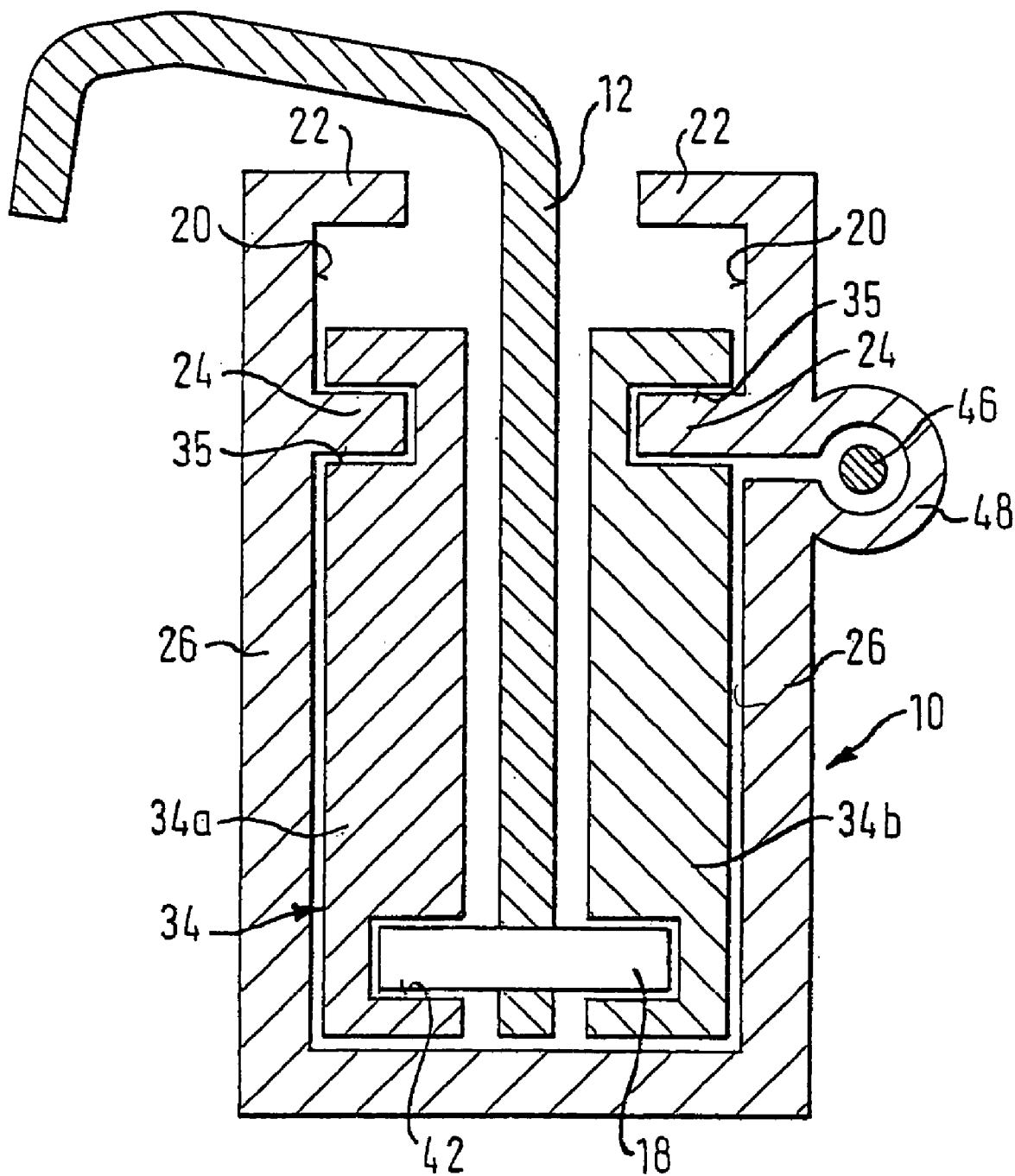
FIG. 5 schematically shows a section along plane V-V of FIG. 3.

The guide rails 10 are a metal profile component. For example, the guide rails are made from an extruded aluminum alloy, and each guide rail has a trough-like cross-section. Received in the guide rails 10 is the cover support 12 which extends into the guide rails 10 from the top. As shown in FIGS. 4 and 5, in an upper portion the guide rail 10 has two opposing guide slots 20 that each are defined between an upper web 22 and a middle web 24 on side walls 26 of the guide rail 10. The two guide slots 20 extend in a straight line along the guide rail 10 except for a foremost portion. The foremost portion of the guide slots 20 is configured in an extension piece 28 made from plastic and put to the guide rail 10. The guide slot 20 extends obliquely downwards in this extension piece 28.

The guide pin 14 at the front end engages into the guide slot 20. With the cover 9 being in a closed position, the guide pin 14 is at a front, lower end of the guide slot 20 in the extension piece 28. The two other guide pins 16, 18 are arranged in a guide carriage 30 that includes a front carriage 32 and a rear carriage 34, as shown in FIGS. 2 and 3. The front carriage 32 and the rear carriage 34 are connected with each other by an articulation, such as a connecting rod 36, which has a ball head 38 on each end. This ball head 38 is rotatably received in each corresponding carriage.

The front and rear carriages 32, 34 are each formed from two parts, which are approximately mirror-inverted to each other. This can be seen in FIG. 5. To better understand this configuration, the two parts of each carriage are identified by reference symbol a or b. Each part 32a, 32b, 34a, 34b of the front and rear carriages 32, 34 is provided on an outer side with a guide groove 35 that slides on the middle web 24 of the side walls 26 of the guide rail 10. Hence, the middle web 24 acts as a guide web for the front and rear carriages 32, 34.

The front carriage 32 cooperates with the guide pin 16 that is between the guide pin 14 at the front end and the guide pin 18 at the rear end. Provided in the front carriage 32 is a guide slot 40 which, as viewed in FIG. 3 from right to left, initially extends at the bottom so as to be horizontal, then ascends obliquely in the direction top left, then remains on a plateau and then ascends in a curve further towards top left. In the opposite part 32b of carriage 32 the guide slot is configured so as to be mirror-inverted.

The rear carriage 34 includes another guide slot 42. This guide slot 42 extends, again as viewed from the right to the left, initially on a lower level so as to be horizontal, and then ascends obliquely in the direction top left to an upper level. Here too, in opposite part 34b of carriage 34 the guide slot 42 is configured mirror-inverted.

A catch 44 is mounted on the part 32b of the front carriage 32. This catch 44 is engaged by a cable 46 (see FIG. 5) which is arranged in a cable duct 48. The cable 46 can be actuated by a motor (not illustrated), so that the catch 44 and thereby front carriage 32 and rear carriage 34 will be moved together in the guide rail 10. By shifting the guide carriage 30 that is formed by front and rear carriages 32 and 34, relative to the cover support 12, the slotted guides, which are formed by the guide slots 20, 40, 42 together with the associated guide pins 14, 16, 18, provide for the desired movement of the cover support 12. Here a frictional pairing of metal/plastics arises in the slotted guides of guide pin 16, guide slot 40, and guide pin 18 and guide slot 42, which is advantageous both in terms of the occurring friction and in terms of compensating for possible tolerances.

In an initial position, i.e. with the cover 9 being closed, the guide carriage 30 relative to the cover support 12 is in the position which is shown in FIGS. 2 and 3. The guide pin 14 at the front end is at the front, lower portion of the guide slot 20.

If the cover 9 is to be opened, the guide carriage 30 is moved in the guide rail 10 toward the rear of the vehicle, i.e. to the right with respect to FIGS. 2 and 3. The cover support 12 cannot follow such movement, because the front portion of the guide slot 20 extends inclined and not horizontally to the rear. Thereby the guide pins 16, 18 are lifted to the top by the guide slots 40, 42 until the cover support 12 reaches a ventilation position. In the ventilation position, a rear edge of the cover 9 is lifted, so that a gap is formed between a surface of the vehicle roof 5 and the rear edge of cover 9. In the ventilation position the guide pin 16 at the front end is on the plateau of the guide slot 40, while the guide pin 18 at the rear end is already in the upper, horizontal portion of the guide slot 42.

In case the cover 9 is to be transferred from the ventilation position to a position shifted to the rear, as it is shown for instance in FIG. 1, then the guide carriage 30 is moved further to the rear. In so doing, the upper, curvedly extending portion of the guide slot 40 further lifts the guide pin 16, whereby the guide pin 14 enters the horizontally extending portion of the guide slot 20. Now the cover support 12 together with cover 9 can be horizontally shifted to the rear in the guide rail 10. For closing the cover 9 the guide carriage 30 again is moved in the opposite direction towards the front.

The sliding roof system described ensures a very precise guidance and a very precise positioning of the cover support 12, because the cover support 12 is guided in the guide rail 10 by the three guide pins 14, 16, 18 in a manner that is statically over-determined. Moreover, the cover support 12 has a high loading capacity in a vertical direction, because the cover support 12 is received in an encapsulated manner in the interior of the guide rail 10 through the guide pins 14, 16, 18 as well as through the guide slot 20 and the front and rear carriages 32, 34. Possible forces in the vertical direction will not result in tilting forces, but are taken up symmetrically.

Finally, the front and rear carriages 32, 34 are guided very precisely by the middle webs 24 of the guide rail 10. The middle webs 24 solely serve for guiding and positioning the front and rear carriages 32, 34, so that the tolerances of other components, for instance in case of a base of the guide rail 10, do not have any influence. The middle webs 24 can be formed with high precision during extruding of the guide rail 10. Also, the fact that the cover support 12 is directly received in the guide carriages, i.e. without any intermediate levers, transmission levers or other mechanisms, provides guiding with high precision.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system for a motor vehicle comprising:
   at least one guide rail;
   at least one guide carriage movably received in the at least one guide rail wherein the at least one guide carriage is formed by a front carriage and a rear carriage; and
   a cover support that can be shifted relative to the at least one guide rail wherein the cover support is connected with the at least one guide carriage through first and second slotted guides and is connected with the at least one guide rail through a third slotted guide, and wherein the third slotted guide is formed within the at least one guide rail with the cover support engaging into the third slotted guide.

2. The sliding roof system according to claim 1 wherein each of the first, second, and third slotted guides are comprised of a guide pin and a guide slot.

3. The sliding roof system according to claim 2 wherein the first slotted guide comprises a first guide pin mounted on the cover support and a first guide slot provided on the at least one guide carriage; the second slotted guide comprises a second guide pin mounted on the cover support and a second guide slot provided on the at least one guide carriage; and the third slotted guide comprises a third guide pin mounted on the cover support and a third guide slot formed within the at least one guide rail.

4. The sliding roof system according to claim 1 wherein the front and rear carriages are connected with each other by an articulation.

5. A sliding roof system for a motor vehicle comprising:
   at least one guide rail;
   at least one guide carriage movably received in the at least one guide rail; and
   a cover support that can be shifted relative to the at least one guide rail wherein the cover support is connected with the at least one guide carriage through first and second slotted guides and is connected with the at least one guide rail through a third slotted guide, and wherein the third slotted guide is formed within the at least one guide rail with the cover support engaging into the third slotted guide, and wherein the at least one guide carriage has first and second parts that are substantially mirror-inverted relative to each other, and wherein the cover support is received between the first and second parts.

6. A sliding roof system for a motor vehicle comprising:
   at least one guide rail;
   at least one guide carriage movably received in the at least one guide rail wherein the at least one guide rail has a guide web that engages into a guide groove provided in the at least one guide carriage; and a cover support that can be shifted relative to the at least one guide rail wherein the cover support is connected with the at least one guide carriage through first and second slotted guides and is connected with the at least one guide rail through a third slotted guide, and wherein the third slotted guide is formed within the at least one guide rail with the cover support engaging into the third slotted guide.

7. The sliding roof system according to claim 4 wherein the articulation comprises a rigid connecting rod having articulation joints at each rod end.

8. The sliding roof system according to claim 5 wherein the first and second parts each include a guide groove that receives a laterally protruding web portion of the at least one guide rail.

9. The sliding roof system according to claim 8 wherein the first and second parts each include one of the first and second slotted guides.

10. The sliding roof system according to claim 1 wherein the third slotted guide includes a guide slot formed directly in the at least one guide rail.

11. The sliding roof system according to claim 10 wherein the first and second slotted guides each include a slot that is formed directly within the at least one guide carriage and a guide pin that is fixed to the cover support such that the slots of the first and second slotted guides are movable relative to the at least one guide rail with the at least one guide carriage while the guide slot of the third slotted guide has a permanently fixed position.

12. A sliding roof system For a motor vehicle compiising:
at least one guide rail;
at least one guide carriage movably received in the at least one cuide rail;
a cover support that can be shifted relative to the at least one guide rail wherein the cover support is connected with the at least one guide carriage through first and second slotted guides and is connected with the at least one guide rail through a third slotted guide, and wherein the third slotted guide is formed within the at least one guide rail with the cover support engaging into the third slotted guide; and wherein the at least one guide rail includes a pair of side walls with an upper web extending inward from each side wall and a lower web extending inward from each side wall and spaced apart from the upper web, with the cover support being received within the at least one guide rail between the pair of side walls.

13. The sliding roof system according to claim 12 wherein the at least one guide carriage is formed by a front carriage and a rear carriage; and wherein the first slotted guide comprises a first guide pin mounted on the cover support and a first guide slot formed within the front carriage; the second slotted guide comprises a second guide pin mounted on the cover support and a second guide slot formed within the rear carriage; and the third slotted guide comprises a third guide pin mounted on the cover support and a third guide slot formed within the at least one guide rail.

14. The sliding roof system according to claim 13 wherein the third guide slot is formed within the at least one guide rail between the upper and lower webs.

15. The sliding roof system according to claim 13 wherein the front and rear carriages each include a guide groove that receives the lower web.

16. The sliding roof system according to claim 15 wherein the front carriage is comprised of first and second parts that are substantially mirror-inverted relative to each other, with each of the first and second parts including the guide groove that faces the at least one guide rail and the first guide slot that faces the cover support; and wherein the rear carriage is comprised of first and second parts that are substantially mirror-inverted relative to each other, with each of the first and second parts including the guide groove that faces the at least one guide rail and the second guide slot that faces the cover support.

* * * * *

UNITED STATES PATENT AND TRADEMARK OFFICE
CERTIFICATE OF CORRECTION

PATENT NO. : 7,273,248 B2 Page 1 of 1
APPLICATION NO. : 11/179759
DATED : September 25, 2007
INVENTOR(S) : Boehm et al.

It is certified that error appears in the above-identified patent and that said Letters Patent is hereby corrected as shown below:

Claim 12, Column 5, line 32: "compiising" should read as --comprising--

Claim 12, Column 5, line 35: "cuide" should read as --guide--

Signed and Sealed this

Twenty-seventh Day of November, 2007

JON W. DUDAS
*Director of the United States Patent and Trademark Office*